Aug. 18, 1959     H. BÉLLER     2,900,245
PRODUCTION OF FINELY DIVIDED METALS
Filed Jan. 24, 1957
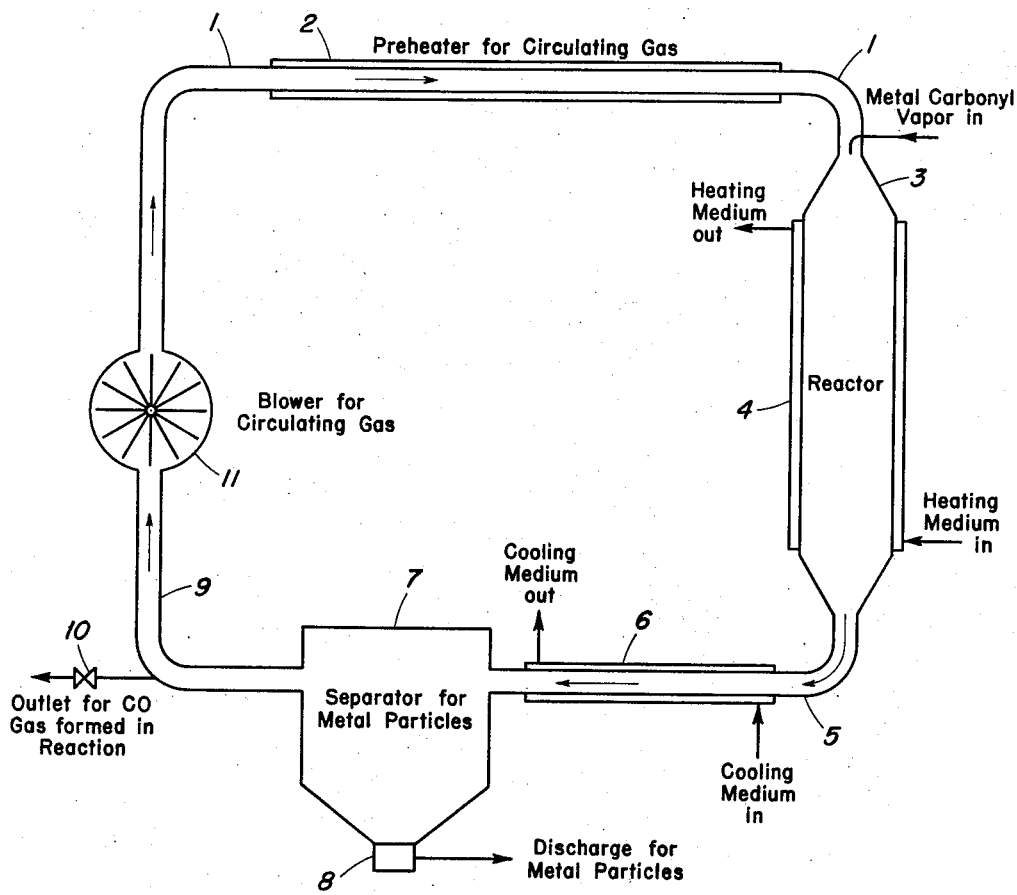
Hans Beller
INVENTOR
BY
ATTORNEY

United States Patent Office

2,900,245
Patented Aug. 18, 1959

2,900,245

PRODUCTION OF FINELY DIVIDED METALS

Hans Béller, Watchung, N.J., assignor to General Aniline & Film Corporation, New York, N.Y., a corporation of Delaware Application January 24, 1957, Serial No. 636,160

3 Claims. (Cl. 75—.5)

This invention relates to the production of fine metal powders, and relates more particularly to a process for preparing fine metal powder by the thermal decomposition of a metal carbonyl.

The decomposition of a metal carbonyl, such as the carbonyl of iron, nickel or cobalt, has been effected by introducing the carbonyl in its vaporized form into a heated vessel in such a manner that the decomposition takes place substantially in the free space of the vessel instead of by contact with the heated walls of the vessel. The metal carbonyl decomposes with the formation of carbon monoxide gas and finely divided metal which is conducted out of the reaction zone by the gas stream and the finely divided metal is separated from the gas by mechanical, magnetic or other suitable means.

Metal powders, such as those of iron, nickel and cobalt, produced in this manner have a wide particle size distribution of say from 2 to 20 microns, and contain, usually, chemically combined carbon and oxygen, the amount of which is dependent primarily upon the temperature at which the decomposition of the carbonyl is carried out. For example, at a decomposition temperature of from 250° to 300° C., the carbon content of the iron powder produced may amount to .9% to 1.2% and above.

One of the most promising applications of finely divided metal powders lies in the electronic field as magnetic materials. Recent developments in the use of such magnetic materials have shown that besides a suitable carbon content, the size of the individual metal particles as well as the particle size distribution of a mixture of such particles are of the greatest importance for the performance in electric devices, particularly in the high frequency and ultra-high frequency field. For applications in the range of say 10 to 50 meg. and above, iron particles having a diameter of 3 to 4 microns or less perform satisafctory, whereas the performance of particles with an average diameter of 6 to 8 microns is inferior. Particles with even larger diameters are of little utility for high frequency work.

As the above metal carbonyl decomposition process has been operated, it invariably led to mixtures having a large percentage of oversized particles, i.e. particle sizes having a diameter of 12 microns or above. Considerable effort has been made in the past to separate such mixtures of particles of widely different sizes into suitable fractions to remove the undesirable particles above a certain maximum size. However, no improvements have been devised for the decomposition process itself which would automatically eliminate the formation of oversized particles or result in powders of a definite, desired particles size. As a matter of fact, the art had about concluded that the only way to obtain uniform particles of the desired size was by the fractionation method.

In my U.S. Patent No. 2,597,701, I have described a process for preparing fine metal particles which is free from the disadvantages of prior art processes. By the process of this patent thermal decomposition of metal carbonyls, such as the carbonyls of iron, nickel or cobalt, can be effected to yield metal powders with a closely controlled particle size distribution and substantially free from particles above a specified, desired maximum size. The feature of the process of this patent consists in the step of limiting, in the decomposition space and under reaction conditions, the contact of undecomposed metal carbonyl with the metal particles formed in the reaction to a predetermined time which is specific for the desired average and maximum particle size of the powder produced.

I have now made the surprising discovery that greater control of the particle size distribution of metal powders produced by the thermal decomposition of metal carbonyls can be attained in a simple and expeditious manner by effecting the decomposition of the metal carbonyl in a circulating gas stream. I have found that the rate or speed of decomposition of the metal carbonyl, and thus the size of the metal particles produced, can be adjusted by the temperature of the gas stream circulating through the decomposition equipment and the pressure maintained in said equipment. The metal powders produced in accordance with my process are particularly suitable for the preparation of magnetic cores used in the high frequency electronic field where contamination of the metal powder with oversized particles is disadvantageous and must be avoided.

In accordance with the process of my invention, metal carbonyls are thermally decomposed to yield metal powders with a controlled particle size distribution and substantially free from desired fractions by an improved procedure consisting in introducing a vaporized metal carbonyl into a stream of inert gas, preferably at an elevated temperature and in such volume as to form a highly diluted mixture, and conducting the resulting dilute mixture of metal carbonyl and inert gas through a reaction zone where closely controlled conditions of temperature, pressure and gas velocity can be maintained, separating from the gaseous stream leaving the reaction zone substantially all of the metal particles formed as well as the carbon monoxide produced in the reaction, and recycling the inert gas. The maintenance of the substantially streamlined gas flow through the reaction zone, with the avoidance of turbulence in said gas flow, results in the obtainment of metal powder of definite particle size. By the process of the instant invention, fine powders of an average size of less than 3 microns are obtained by adjusting the volume of inert gas to the volume of metal carbonyl vapor introduced into the stream of inert gas to a ratio of at least 20:1 so that the reaction takes place in a dilute system. Even higher dilution rates may be employed in the instant process, namely on the order of up to 100 volumes of diluent gas per volume of metal carbonyl vapor.

The process of my invention may be carried out at atmospheric, subatmospheric, or superatmospheric pressures and at temperatures from 150 to 350° C. Any suitable inert gas may be used as the diluent or carrier gas, such as, for example, ammonia, nitrogen and hydrogen. A preferred method of carrying out my invention whereby a definite rate of decomposition takes place is maintaining the temperature in the decomposition space or reactor at from 200 to 250° C. and adjusting the flow of diluent gas and metal carbonyl through said reactor so that it passes continuously through the same at a rate of 20 cubic feet per minute when the pressure in the reactor is at 10 pounds per square inch absolute. Generally, the temperature of decomposition will range from 200 to 300° C. and the pressure from 2 mm. to 2 atmospheres or higher, lower pressures being used where higher temperatures are employed.

The following example which further illustrates the nature of my invention will be set forth with reference to the accompanying drawing which diagrammatically illustrates an apparatus suitable for carrying out my invention. It is to be understood that my invention is not limited to said example and said apparatus.

*Example*

Iron penta carbonyl is evaporated in a steam heated evaporator not shown. The vapor is fed from said evaporator at the rate of one cubic foot per minute at atmospheric pressure into a conduit 1 where it is mixed with twenty parts by volume of ammonia which has been preheated to a temperature of 250° C. by a hot gas circulating through jacket 2 surrounding the conduit 1. The mixture of diluent gas and carbonyl vapor is continuously passed through a reactor 3 which is heated to and maintained at a temperature of 250° C. by a hot gas circulating through a jacket 4 surrounding the reaction chamber, the carbonyl vapor being decomposed as it passes through the reaction zone into finely divided iron particles and carbon monoxide gas. The rate of movement of the incoming mixture through the reaction zone is 20 cubic feet per minute and is such that no turbulence occurs in said reaction zone. The reaction mixture leaves the reactor through conduit 5 which is provided with a jacket 6 through which a cooling medium circulates whereby the reaction mixture is cooled to a temperature of 50–100° C. The cooled reaction mixture then passes into a separator 7 wherein the metal particles are substantially completely separated from the gaseous mixture of carbon monoxide and diluent gas, the metal particles being discharged at one end of the separator, employing any suitable means 8. The gaseous mixture leaves the separator through a conduit 9 having therein an outlet 10 whereby the carbon monoxide gas is removed from the gaseous mixture. The removal of carbon monoxide from the circulating gas stream involves the absorption of the carbon monoxide in an aqueous ammoniacal solution of cuprous carbonate or an acid solution of cuprous chloride. The absorption step is operated at room temperature and elevated pressures. Recovery of the carbon monoxide gas and the absorbent is effected by releasing the pressure and heating the rich liquor above 50° C. The diluent gas then passes through a suitable blower 11 for causing the circulation thereof through the system.

It is to be understood that the foregoing detailed description is given merely by way of illustration and that many variations may be made therein without departing from the spirit of my invention.

Having described my invention what I desire to secure by Letters Patent is:

1. Process for the production of fine metal powders by thermally decomposing a metal carbonyl, which comprises introducing a vaporized metal carbonyl into a moving stream of inert gas circulating in a relatively closed system, so as to cause a highly dilute mixture of inert gas and metal carbonyl vapor to be formed, continuously passing the resulting mixture through a reaction zone, maintained at a temperature of 150 to 350° C. and at a pressure of 2 mm. to 2 atmospheres, under streamlined conditions of flow without turbulence whereby decomposition of the metal carbonyl is effected with the production of metal particles and carbon monoxide, removing the products of decomposition together with said inert gas from the reaction zone, separating the metal particles and the carbon monoxide from the inert gas and recycling the inert gas.

2. Process as defined in claim 1 in which the mixture of inert gas and carbonyl vapor contains from 20 to 100 volumes of inert gas for each volume of metal carbonyl vapor.

3. Process as defined in claim 1 in which the mixture of inert gas and metal carbonyl vapor passes into the reaction zone at the rate of 20 cubic feet per minute.

References Cited in the file of this patent

UNITED STATES PATENTS

| | | |
|---|---|---|
| 1,836,732 | Schlecht et al. | Dec. 15, 1931 |
| 2,597,701 | Beller | May 20, 1952 |
| 2,726,951 | Ramsay et al. | Dec. 13, 1955 |

FOREIGN PATENTS

| | | |
|---|---|---|
| 679,439 | Great Britain | Sept. 17, 1952 |
| 682,897 | Great Britain | Nov. 19, 1952 |
| 684,054 | Great Britain | Dec. 10, 1952 |
| 741,978 | Great Britain | Dec. 14, 1955 |
| 751,045 | Great Britain | June 27, 1956 |